Oct. 28, 1969      R. H. DAMMAR      3,474,515
LEAD FORMING APPARATUS
Filed July 14, 1966      7 Sheets-Sheet 4
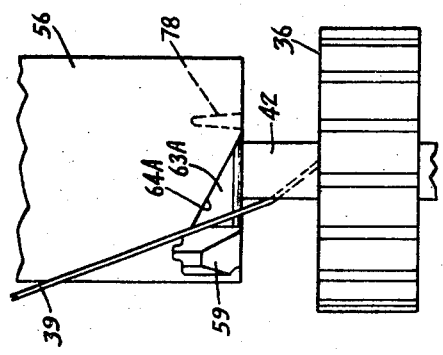
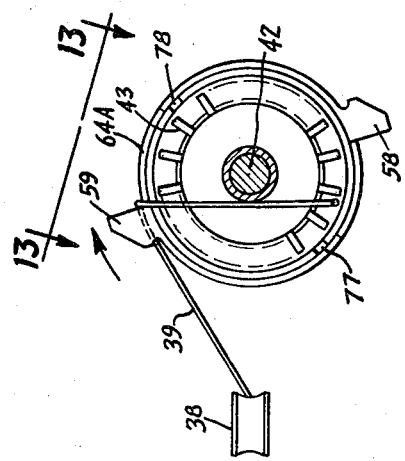
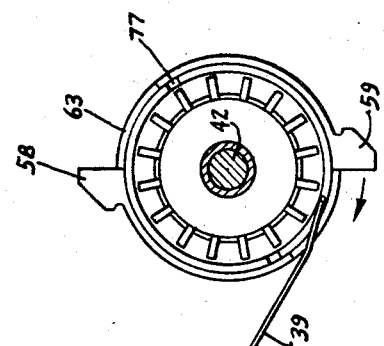
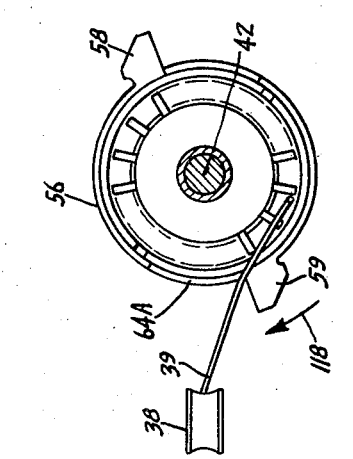
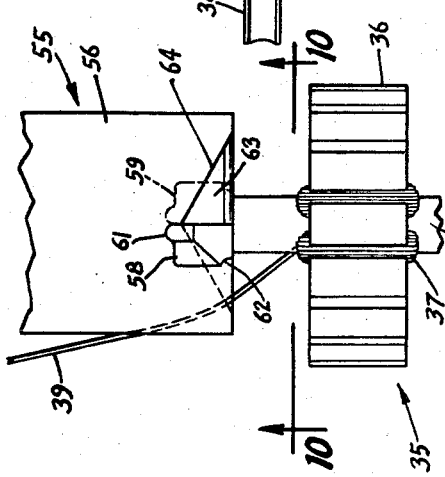
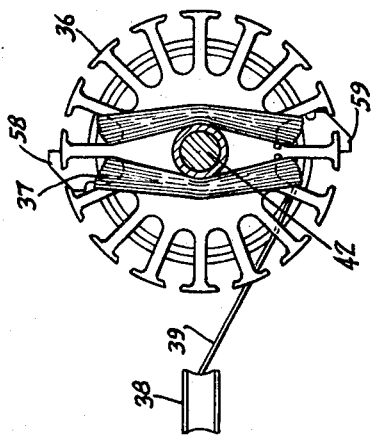
INVENTOR.
RAYMON H. DAMMAR
BY
Braddock + Burd
ATTORNEYS

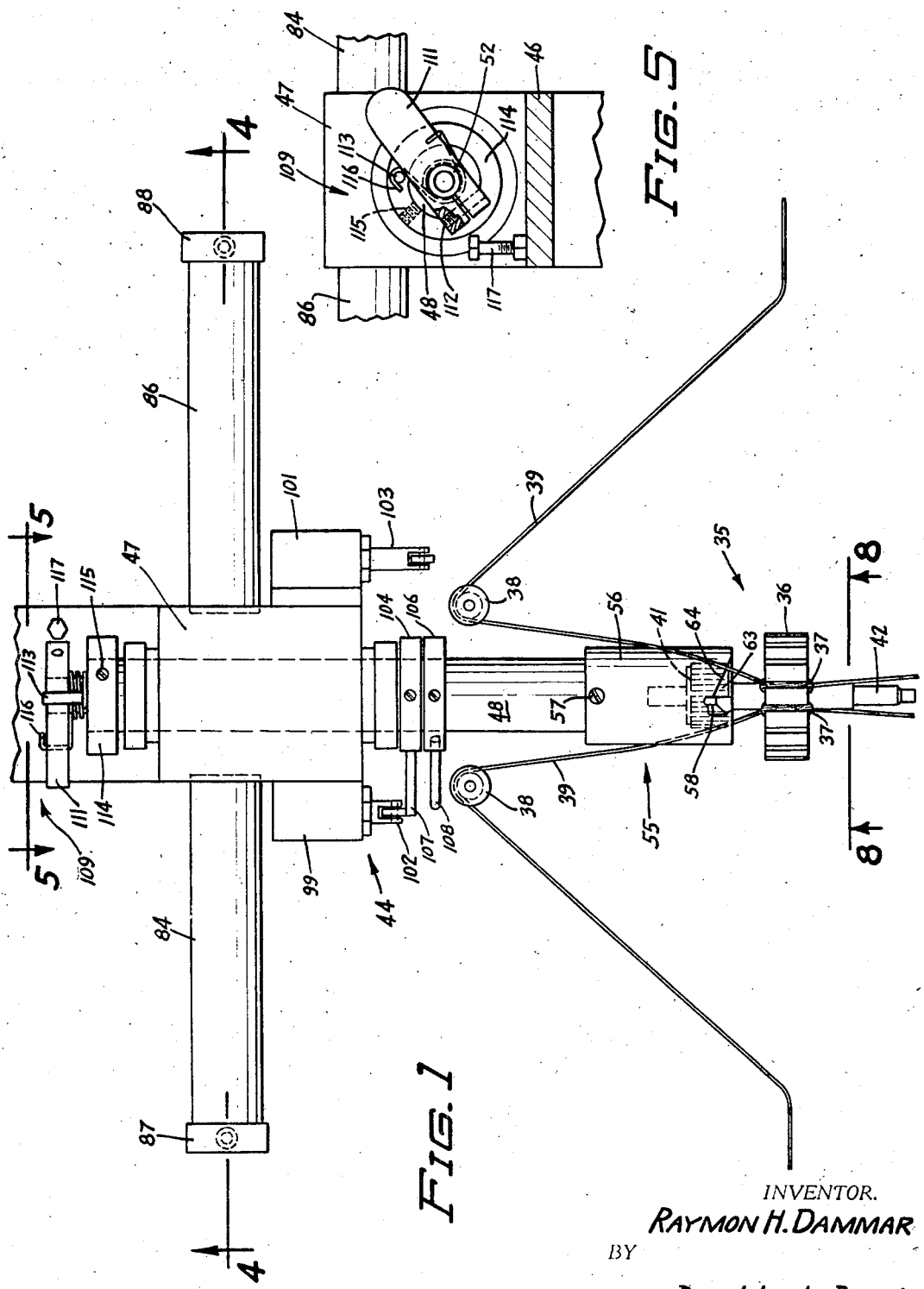

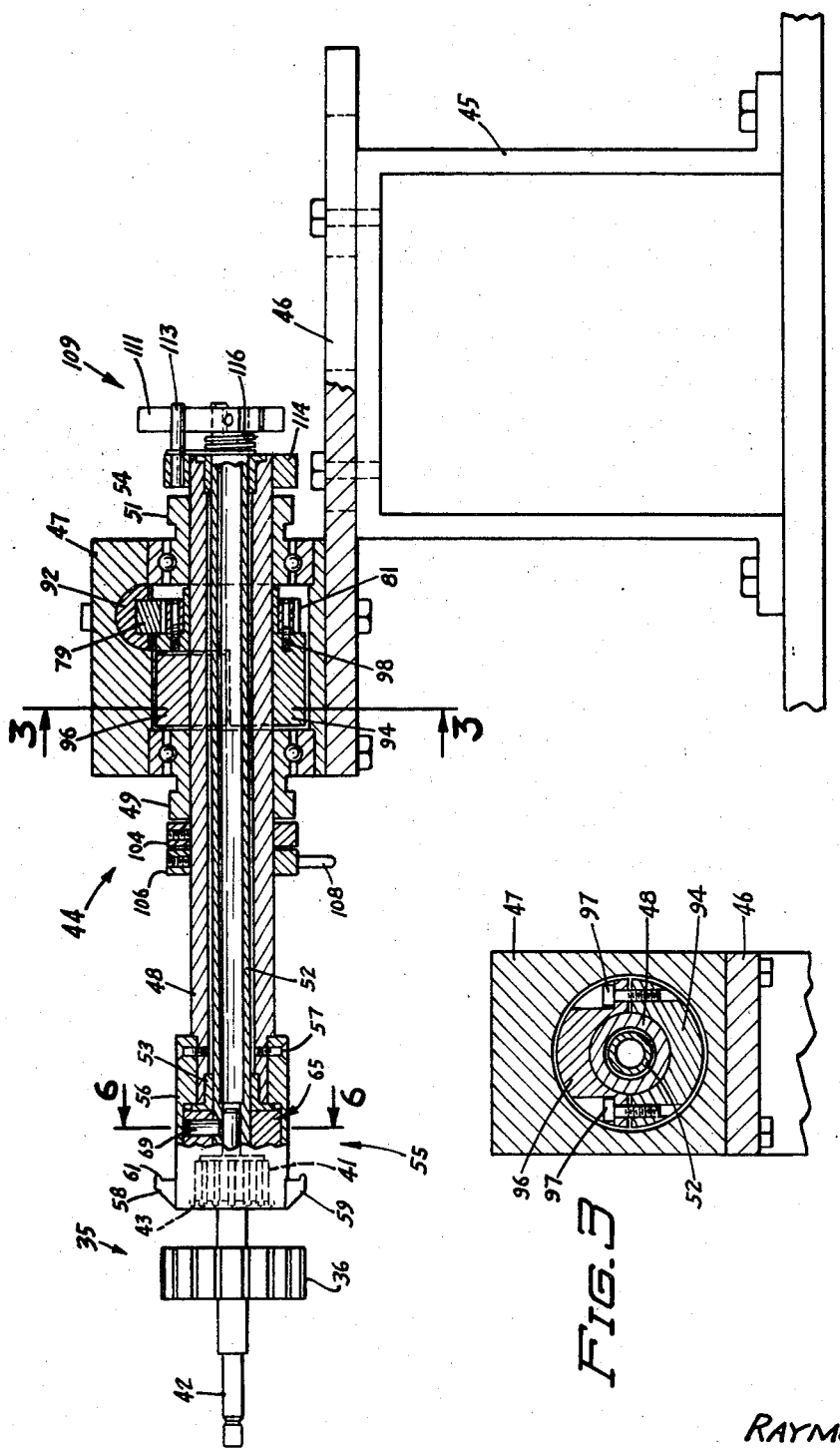

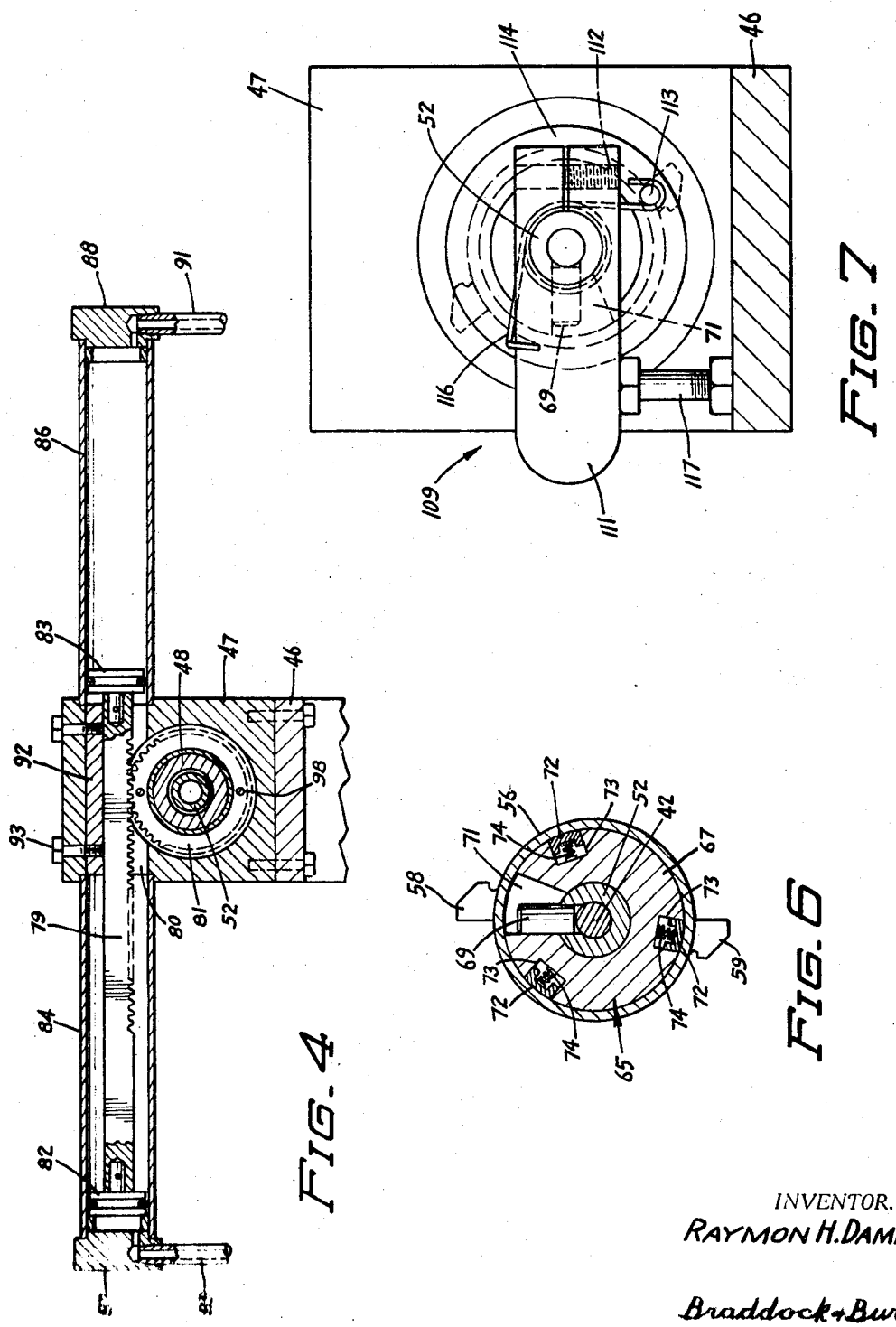

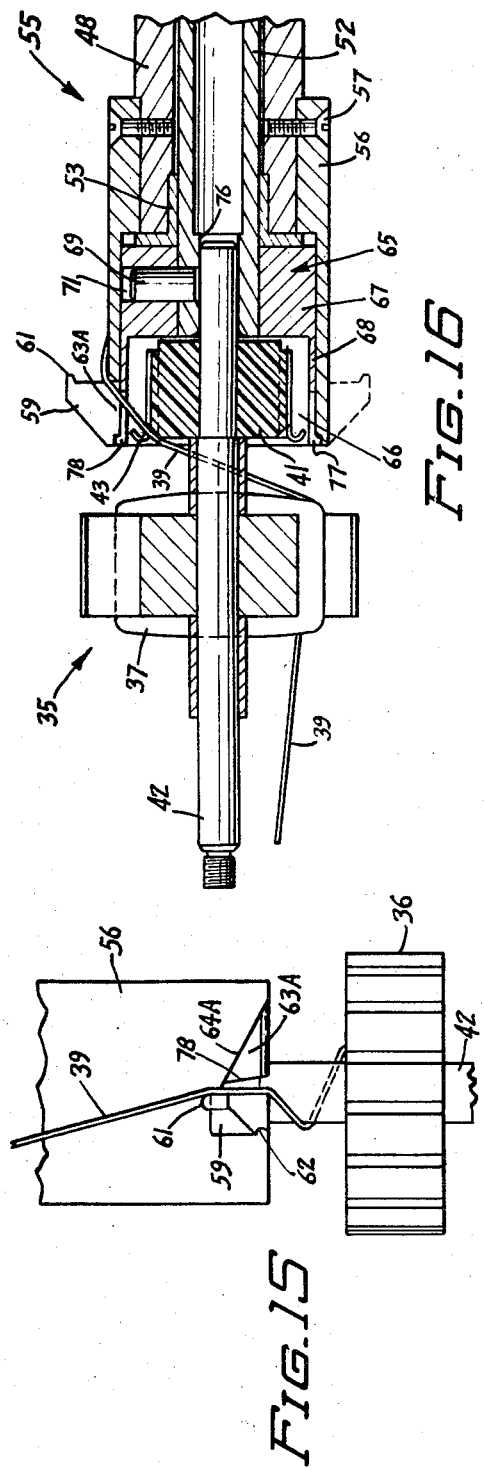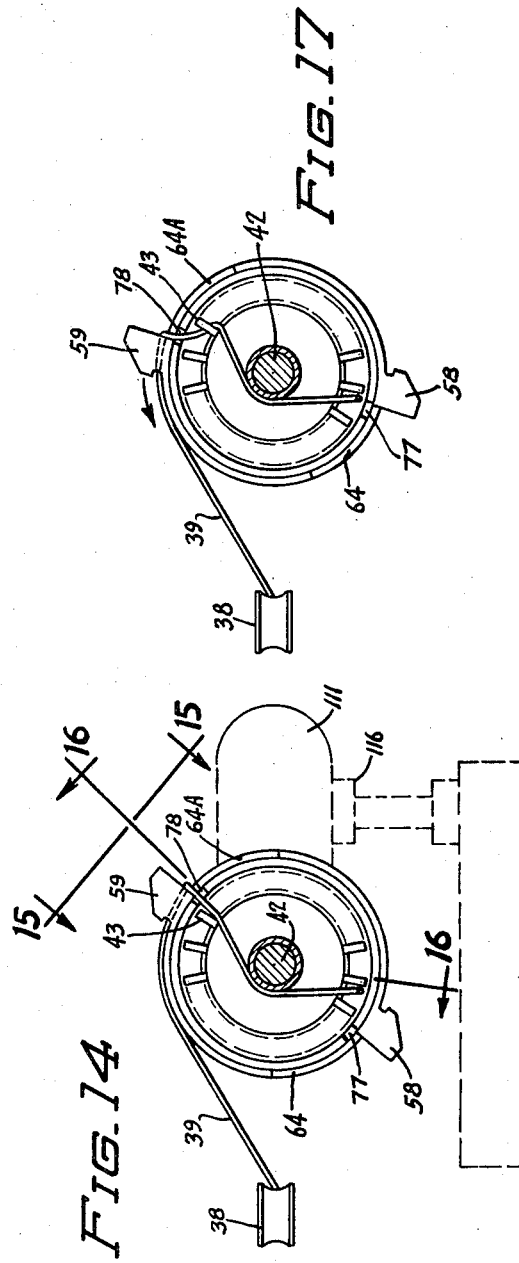

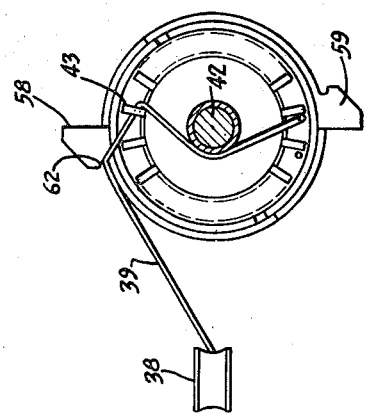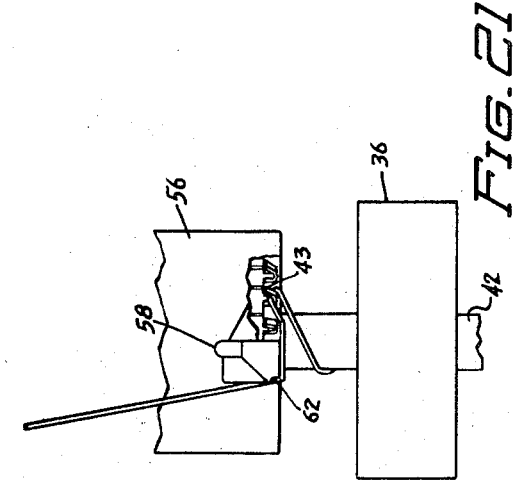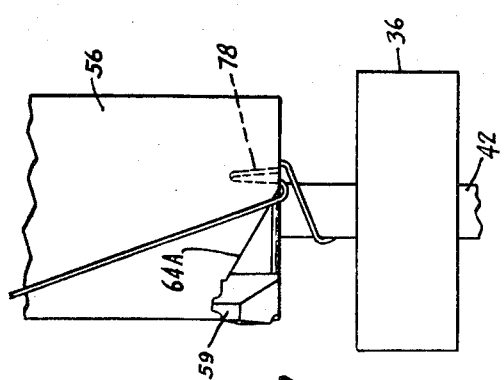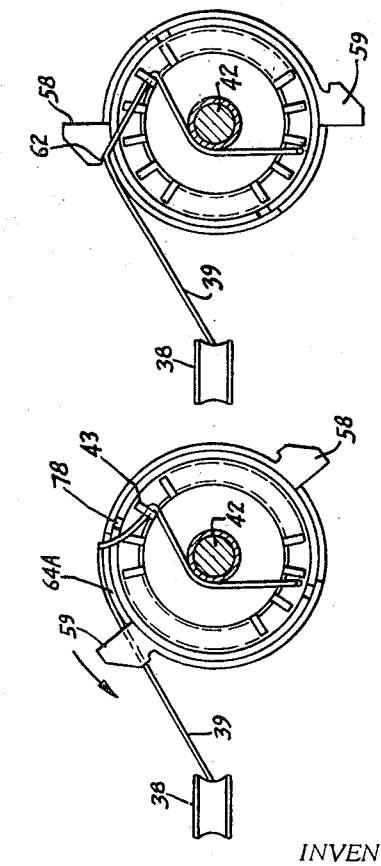

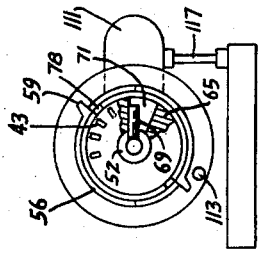
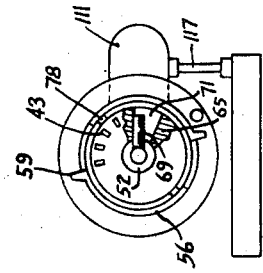
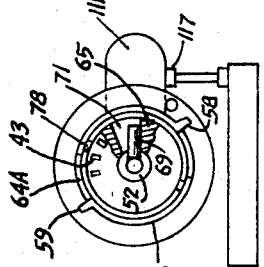
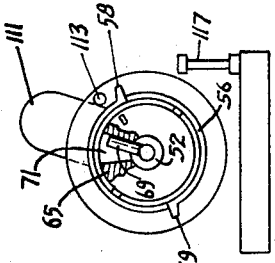
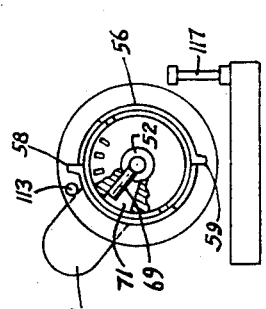
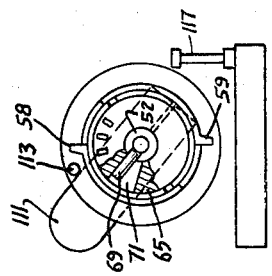
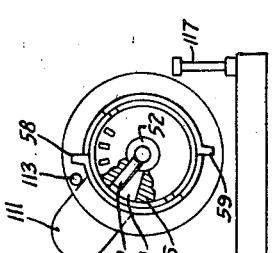
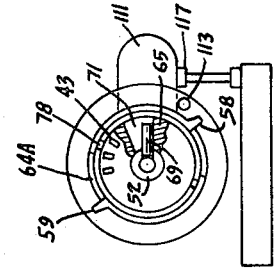
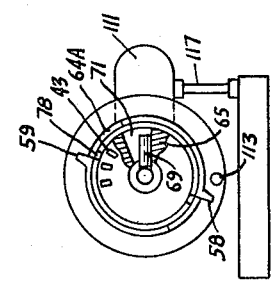

United States Patent Office 3,474,515
Patented Oct. 28, 1969

3,474,515
LEAD FORMING APPARATUS
Raymon H. Dammar, Minneapolis, Minn., assignor to Possis Machine Corporation, Minneapolis, Minn.
Filed July 14, 1966, Ser. No. 565,291
Int. Cl. H01r 43/00
U.S. Cl. 29—205                                                          15 Claims

ABSTRACT OF THE DISCLOSURE

This disclosure pertains to apparatus usable in conjunction with a winding machine operable to wind a coil directly into slots of a slotted armature core for locating the leading end of the coil adjacent the shaft carrying the core and placing this lead about a selected commutator hook with all the hooks except the selected hook being located in a shielded position.

---

This invention relates to an apparatus for attaching leads to a commutator of a rotor for an electrical machine. More particularly the invention is directed to an apparatus usable in conjunction with a winding machine operable to wind a coil directly into slots of a slotted armature core for locating the ending lead of the coil adjacent that shaft carrying the core and placing this lead about a selected commutator hook with all the hooks except the selected hook being located in a shielded position.

Briefly described the lead attaching apparatus has a lead moving, guiding and shielding unit operable to carry the leads extended from the core slots around the shaft and under selected hooks or tangs of a commutator. The unit has two concentric members in the form of cups or thimbles operable to concurrently cover the hooks on a hook type commutator and to direct the leads to desired hooks. The outer member has lead moving radial fingers or lugs and grooves adjacent the forward sides of the fingers. The inner member has a chamber for the commutator and covers the hooks except for narrow slots that are positioned adjacent selected hooks and forward of the grooves. Both members turn together to locate the leads in the grooves and commence carrying the leads around the shaft from the winding source to the desired commutator hook. The inner member reaches the desired position first. The outer member continues to carry the lead around the shaft until the lead falls from the grooves into the slots in the inner member to engage the selected commutator hooks. The concurrent and relative movements of the members are determined by a drive control which sequences the forward and reverse motions of the members.

On initial reverse movement the members turn together to secure the lead on the selected commutator hook and prevent it from slipping off the hook. Continued reverse motion of the outer member relative to the inner member plows the leads out of the slots in the inner member. When the leads are out of the slots both members return to their initial positions. The commutator remains in the shielded position so that the hooks will not catch the leads while the next coils are being wound.

The drawings are briefly described as follows:

FIGURE 1 is a plan view of the lead attaching apparatus of this invention with an armature receiving coils from a coil winding machine;

FIGURE 2 is a side view of FIGURE 1 partly in section;

FIGURE 3 is a sectional view taken along the line 3—3 of FIGURE 2;

FIGURE 4 is a sectional view taken along the line 4—4 of FIGURE 1;

FIGURE 5 is a sectional view taken along the line 5—5 of FIGURE 1;

FIGURE 6 is an enlarged sectional view taken along the line 6—6 of FIGURE 2;

FIGURE 7 is an enlarged view similar to FIGURE 5 showing the arm of the drive control in engagement with a stop;

FIGURE 8 is an enlarged sectional view taken along the line 8—8 of FIGURE 1;

FIGURE 9 is a fragmentary plan view of FIGURE 8;

FIGURE 10 is a sectional view taken along the line 10—10 of FIGURE 9;

FIGURE 11 is a sectional view similar to FIGURE 10 showing the engagement of the lower finger with the lead;

FIGURE 12 is a sectional view similar to FIGURE 10 showing the finger carrying the lead circumferentially around the rotor shaft;

FIGURE 13 is a top view of FIGURE 12 taken along line 13—13;

FIGURE 14 is a sectional view similar to FIGURE 10 showing the finger positioning the lead in alignment with the lead slot in the inner member;

FIGURE 15 is a fragmentary plan view taken along line 15—15 of FIGURE 14;

FIGURE 16 is an enlarged sectional view taken along the line 16—16 of FIGURE 14;

FIGURE 17 is a sectional view similar to FIGURE 10 showing the finger moving back to its initial position with the lead positioned about a hook on a commutator segment;

FIGURE 18 is a sectional view similar to FIGURE 10 showing the lead being moved out of the slot in the inner member by the rotating outer member;

FIGURE 19 is a plan view of FIGURE 18;

FIGURE 20 is a sectional view similar to FIGURE 10 showing the fingers in their initial positions with one lead positioned about a hook on a commutator segment;

FIGURE 21 is a plan view of FIGURE 20 with part of the sleeve broken away to show the lead around the hook;

FIGURE 22 is a sectional view similar to FIGURE 20 showing the rotor indexed to the next coil receiving position; and FIGURES 23 to 31 are diagrammatic views partly sectioned showing the sequential relationships between the driving control structure and the movable lead carrying fingers with respect to the lead receiving hook on the commutator.

Referring to the drawings there is shown in FIGURE 1, a rotor for an electrical machine indicated generally at 35 positioned in working relation with a lead attaching apparatus indicated generally at 44. Rotor 35 has a soft iron armature core 36 formed with a plurality of circumferentially spaced longitudinal slots for receiving coils of wire 37 forming electrically effective coil loops. The coils of wire are wound or placed on armature core 36 by a winding machine (not shown) having movable fliers 38 for directing the wire leads 39 into pairs of slots in the armature core. Axially spaced from core 36 is a commutator 41 mounted on a shaft 42 carrying armature core 36. Commutator 41 has a plurality of circumferentially spaced conducting segments forming an outer cylindrical face. Each segment facing core 36 has an outwardly opened hook or tang 43 turned upwardly and forwardly away from the core to receive and hold leads 39 extended from the slots.

Lead attaching apparatus 44 operates in conjunction with the winding machine to carry the ending leads extended from the slots around the shaft and over hooks to eliminate bridging of the leads extended from the coil slot and to place the leads around commutator hooks circumferentially spaced from the slots containing the ending leads. As shown in FIGURE 2, apparatus 44 has a flat frame or base plate 46 carrying a box shaped housing 47. Frame 46 has a plurality of elongated openings adapted to receive bolts used to secure the frame to a machine support 45 or the like. Housing 47 has a longitudinal bore accommodating an elongated outer tubular shaft 48. Ball bearing assemblies 49 and 51 rotatably mount tubular shaft 48 on housing 47. Concentrically positioned within tubular shaft 48 is an inner shaft 52. Sleeve bearings 53 and 54 located in opposite ends of shaft 48 rotatably mount shaft 52 within tubular shaft 48.

Mounted on the forward end of shafts 48 and 52 is a commutator shielding and lead moving and guiding unit indicated generally at 55 operable to move and guide the ending wire leads extending from the coil about rotor shaft 42 and in engagement wtih selected commutator hooks while at the same time shield the entire commutator except the selected hooks thereby preventing other or previously engaged leads from leaving their hooks. As shown in FIGURE 16, unit 55 comprises an outer sleeve or cup member 56 telescoped over and secured to the end of tubular shaft 48 with screws 57. Projected radially from the forward portion of sleeve 56 are a pair of lugs or fingers 58 and 59. The fingers are identical in construction and are generally diametrically opposed from each other. As shown in FIGURES 9 and 10, front or leading faces of fingers 58 and 59 lie in a common plane which pass through the axis of rotation of the shafts 48 and 52. The trailing and outward side faces of the lugs are each inclined upwardly and converge to flat heads having rearward projections 61. Axial recesses 62 are located in the bottom portions of the trailing faces. Located adjacent the leading face of finger 58 is a triangular shape groove 63 having an inclined plowing edge 64. A similar triangular shape groove 63A is located adjacent the leading face of finger 59. As shown in FIGURES 14 and 15, the opposite side of sleeve 56 has a similar plowing edge 64A extended circumferentially forward of lug 59.

Concentrically disposed within sleeve 56 is a thimble or inner cup member indicated generally at 65 defining a cylindrical chamber 66 for receiving and shielding the entire commutator 41. Cup member 65 has a base 67 and an outwardly projected cylindrical flange 68. Base 67 is drivably connected to the inner shaft 52 with a radially disposed pin 69 having an inner end positioned in a hole in shaft 52 and an outer end projected to an angular or pie-shaped slot 71 in base 67. As shown in FIGURE 6, slot 71 provides a lost motion connection of about 20 degrees between inner shaft 52 and cup member 65.

Cup member 65 is in a friction driving relation with outer sleeve 56 through a plurality of circumferentially spaced shoes 72 located in radial recesses 73 in base 67. Springs 74 positioned in recesses 73 bias the shoes radially outwardly into frictional engagement with the inner surface of outer sleeve 56. The outwardly biased shoes 72 establish a friction drive between the member 65 and outer sleeve 56.

As shown in FIGURE 16, the forward end of inner shaft 52 has an axial bore 76 for accommodating the end of the rotor shaft 42. Bore 76 axially aligns the rotor with the lead moving and guiding unit to insure the location of commutator 41 within the chamber 66. Cylindrical flange 68 has axial slots 77 and 78 open to the outer end of member 65 and normally covered by outer sleeve 56. Slots 77 and 78 are located immediately adjacent the leading ends of the plowing edges 64 and 64A respectively. In use, slots 77 and 78 receive the leads located in grooves 63 and 63A and allow these leads to move axially over commutator hooks and move the leads around the hooks.

Referring to FIGURE 4, shafts 48 and 52 are angularly moved with a rack and pinion drive comprising an elongated rack 79 engaging a pinion gear 81. The rack extends transversely through an opening 80 in housing 47 with the opposite ends of rack 79 secured to pistons 82 and 83 located within cylinders 84 and 86 respectively. The inner ends of the cylinders are secured to housing 47 closing opening 80. Caps 87 and 88 secured to the outer ends of the cylinders 84 and 86 are coupled to lines 89 and 91 used to supply hydraulic fluid, as air, under pressure selectively to the cylinders to drive the pistons toward housing 47. The top of rack 79 rides on a bearing plate 92 transversely positioned transversely positioned in housing 47 and secured to the top of housing 47 with bolts 93. As shown in FIGURE 2, plate 92 has an elongated rectangular guideway for rack 79 and maintains the teeth of the rack in meshing engagement with the teeth of pinion gear 81.

As shown in FIGURES 2 and 3, a clamp unit comprising a sleeve portion 94 and a clamp portion 96 located in housing 47 is attached to outer shaft 48 by bolts 97. Sleeve portion 94 has a radial flange surrounding outer shaft 48 and accommodating bolts 98 securing pinion gear 81 to sleeve portion 94 so that on rotation of pinion gear 81 the outer shaft angularly moves relative to housing 47. Outer shaft 48 rotates approximately 180 degrees as determined by a pair of limit switches 99 and 101 mounted on opposite sides of housing 47 as shown in FIGURE 1. Switches 99 and 101 have forwardly projected actuators 102 and 103 used to control suitable valves (not shown) for directing fluid under pressure to cylinders 84 and 86 respectively. Actuators 102 and 103 are controlled by the angular positions of a pair of collars 104 and 106 adjustably mounted on outer shaft 48. The collars have radially directed arms 107 and 108 respectively which engage actuators 102 and 103 to determine the clockwise and counterclockwise stop positions of outer shaft 48.

Rotational movement of outer shaft 48 with respect to inner shaft 52 is regulated with a drive control indicated generally 109 in FIGURES 1, 2, 5 and 7. Drive control 109 comprises a radial arm 111 having a bifurcated inner end clamped about the end of inner shaft 52 with a bolt 112 whereby arm 111 angularly moves with inner shaft 52. Arm 111 is engaged by a rearwardly projected pin 113 secured to a collar 114. A fastening means 115, as a set screw, adjustably mounts collar 114 on outer shaft 48 to provide a positive drive connection between collar 114 and outer shaft 48. A coil spring 116 concentrically disposed about the rear end of inner shaft 52 provides a resilient link between pin 113 and arm 111. Spring 116 has one end hooked over pin 113 and an opposite end hooked about the inner edge of arm 111 so as to resiliently urge arm 111 into engagement with pin 113. On rotation of outer shaft 48 in response to the application of fluid under pressure to cylinder 84, the outer shaft 48 and inner shaft 52 rotate together by reason of the friction drive established by shoes 72. The rotating inner shaft 52 carries arm 111 toward and into engagement with an adjustable stop 117, as a bolt threaded into base plate 46. As shown in FIGURE 7, when arm 111 engages the head of stop 117 inner shaft 52 is prevented from further rotation. The outer shaft 48 continues to rotate the inner cup member 65 in an amount equal to the lost motion of pin 69 in an angular slot 71. During this movement pin 113 moves away from arm 111 against the biasing force of spring 116.

On reversing the direction of the movement of rack 79 by applying hydraulic fluid under pressure to cylinder 86 the outer sleeve 48 rotates in a reverse direction moving pin 113 back into engagement with the arm 111. Spring 116 holds arm 111 into engagement with stop 117. Inner cup member member 65 rotates with sleeve 56 until the lost motion of slot 71 is taken up by pin 69. At this time sleeve 56 rotates relative to cup member 65 overriding the friction drive of shoes 72 until pin 113 engages arm 111. Arm 111 is carried back to its initial position by pin 113 allowing cup member 65 to be moved with sleeve 56 back to their starting positions.

In use, rotor 35 held by the winding machine in an indexed position with the end of the rotor shaft 42 in bore 76 of the leading, moving, guiding and shielding unit 55. The entire commutator 41 is positioned in cylindrical chamber 66 with the ends of hooks 43 close to flange 68 to prevent leads from coming off the hooks and shielding the hooks from the wire as it is wound on core 36. Movable fliers 38 of the winding machine wind wire leads 39 in separate pairs of core slots around core 36 forming the coils 37. As shown in FIGURE 1, ending leads 39 from coils 37 extend from the core 36 adjacent the top and bottom portions of outer sleeve 56. The following description is directed to the movement of the left lead 39 located under the sleeve 56 and engageable with finger 59. The opposite or right lead is moved and hooked in a similar manner as left lead 39 and engages finger 58.

Referring to FIGURES 8, 9 and 10, there is shown core 36 in an indexed position with the coils 37 wound on the core in substantially vertical planes by movable fliers 38. Bottom lead 39 extends from coil 37 rearwardly around the flier pulley adjacent the bottom of sleeve 56 forwardly of finger 59. When coil 37 is completed the winding machine sends a signal which actuates a valve (not shown) to supply fluid under pressure to cylinder 84 driving piston 82 to the left as shown in FIGURE 4. Rack 79 cooperates with pinion gear 81 to rotate outer shaft 48 along with the inner shaft 52. Shaft 48 rotates outer sleeve 56 as shown in FIGURE 11 moving finger 59 into engagement with ending lead 39 carrying the lead in an upward direction as shown by arrow 118. As the sleeve 56 continues to rotate lead 39 falls into groove 63A in the outer edge of sleeve 56 adjacent the forward side of finger 59. As shown in FIGURES 12 and 13, lead 39 is moved circumferentially around the shaft 42 and retained in groove 63A by the tension on the lead from the winding machine.

FIGURES 23, 24 and 25 show outer sleeve 56 rotated in the clockwise direction with finger 59 moved upwardly along with the arm 111 of the drive control 109. FIGURE 25 compares with FIGURE 12. In this position arm 111 engages stop 117 thereby preventing further rotation of inner shaft 52. The inner cup member 65 continues to rotate with outer sleeve 56 by reason of the friction drive established by the shoes 72 as shown in FIGURE 6 and the lost motion of slot 71 and pin 69. Cup member 65 continues to rotate with outer sleeve 56 until pin 69 engages the opposite wall of slot 71 as shown in FIGURES 7 and 26. Continued rotation of outer shaft 48 moves outer sleeve 56 relative to cup member 65 until slot 78 is in alignment with groove 63A as shown in FIGURES 15, 16 and 27. In this position finger 59 has carried ending lead 39 approximately 180 degrees around shaft 42. The tension on lead 39 by the winding machine moves the lead forwardly into slot 78. The length of slot 78 is sufficient to position the lead adjacent the far side of hook 43 of commutator 41. As shown in FIGURE 16, lead 39 is in slot 78 and is positioned below and forwardly of the end of the hook.

At this point arm 108 engages actuator 103 of switch 101 thereby terminating the flow of fluid into cylinder 84 and actuating a valve (not shown) operable to apply fluid under pressure to cylinder 86 thereby reversing the direction of rotation of outer shaft 48. As shown in FIGURES 27 and 28, arm 111 is held in engagement with stop 117 during the initial reverse movement of the shaft 48 by spring 116 interconnecting arm 111 with pin 113. In FIGURE 27, slot 78 is adjacent the forward side of hook 43. On initial reverse drive of outer sleeve 36 cup member 65 moves with sleeve 56 with slot 78 aligned with groove 63A carrying lead 39 under hook 43 as shown in FIGURE 17. Slot 78 and groove 63A move together because of the lost motion of pin 69 in angular slot 71. Pin 69 holds up member 65 from further reverse relative rotation with respect to inner shaft 52 thereby fixing the angular location of slot 78.

Outer sleeve 56 continues to rotate because of the direct drive connection with outer shaft 48. Spring 116 holds arm 111 in engagement with stop 117 thereby preventing rotation of inner cup member 65. Sleeve 56 rotates in a reverse direction relative to cup member 65 since the force of spring 116 is greater than the friction drive of shoes 72 on sleeve 56. This relative rotation between the outer sleeve 56 and cup member 65 moves the inclined plow surface 64A over slot 78 forcing the wire lead 39 out of slot 78 onto the end of sleeve 56 thereby moving the wire lead in a backward direction adjacent the rear side of hook 43. This completes the placement of the lead about hook 43 and places the hook in a shielding position within chamber 66. As shown in FIGURES 18 and 19, plowing surface 64A moves the wire lead 39 around hook 43 and out of slot 78.

As shown in FIGURE 29, pin 113 is moved into engagement with arm 111 whereby the outer shaft 48 drives inner cup member 65 and sleeve 56 together back to their initial positions. As the sleeve 56 continues to rotate back to its initial position the opposite finger 58 engages lead 39 as shown in FIGURES 20 and 21. The lead is retained on the finger as it falls into recess 62 on the trailing side of the lug. As shown in FIGURE 30, pin 113 is in contact with arm 111 establishing a positive drive connection between the outer shaft and the inner shaft. Cup member 65 is in frictional drive relationship with outer sleeve 56 since pin 69 engages the trailing side of slot 71. This location of pin 69 in slot 71 is maintained during the indexing of the rotor to the next position for receiving additional coils of wire as shown in FIGURE 31. FIGURE 22 shows the position of the trailing portion of the last wound coil lead located approximately 180 degrees around shaft 42 and around commutator hook 43. The commutator has been indexed to the next position for receiving additional coils in adjacent pairs of slots. During the indexing of the rotor the fingers 58 and 59 are not rotated as the rotor shaft 42 is free to turn in bore 76.

Each succeeding terminating lead for each of the coils wound on the core are moved circumferentially around a portion of the shaft located between the core and the commutator and around the commutator hook from the far side in a manner described above until the desired number of coils have been wound on the core. During the winding of the core all of the leads placed about commutator hooks are in a shielded location located in the chamber 66 formed by the cup shaped member 65. This prevents the leads from becoming unhooked from the commutator hooks and places all commutator hooks in a shielded position during the winding of additional coils on the core and during the movement of the ending leads about selected hooks.

The invention is to be limited only by the terms and scope of the following claims.

The embodiments of the invention in which an exclusive property or privilege is claimed are defined as follows:

1. A lead attaching apparatus usable with a winding machine operable to wind a coil directly into slots of a slotted armature core, said core being mounted on a shaft carrying a commutator provided with a plurality of circumferentially spaced lead receiving hooks comprising a lead moving and guiding unit for carrying the lead extended from one slot partially around the shaft and under a hook, said unit including an outer sleeve having a radially projected finger engageable with said lead and a groove adjacent the forward side of the finger, an inner member having a chamber for receiving the commutator to shield said commutator and a slot open to the end of the member, said inner member located within said outer sleeve with the slot normally forward of the groove, means for rotating said outer sleeve selectively in opposite directions thereby angularly moving said finger carrying the lead around the shaft, drive means connecting the inner member with the outer sleeve whereby the inner member rotates with the outer sleeve and drive control means connecting the inner member with the outer sleeve operable to stop the outer sleeve and allow limited relative movement between the outer sleeve and the inner member to align the slot in the inner member with the groove whereby the lead is moved adjacent to a selected hook and to position the groove rearward of the slot thereby moving the lead under the selected hook.

2. The apparatus of claim 1 wherein said lead moving and guiding unit carries the lead from about 90 to 270 degrees around the shaft.

3. The apparatus defined in claim 1 wherein said outer sleeve has a pair of circumferentially spaced radial fingers, each finger engageable with a separate lead, and axial grooves adjacent the forward sides of the fingers, said inner member having axial slots forwardly of said grooves.

4. The apparatus defined in claim 1 wherein said drive means comprises a plurality of outwardly biased shoes providing a friction drive between the outer sleeve and the inner member.

5. The apparatus defined in claim 1 wherein said drive control means comprises an arm connected to the inner member, pin means connected to the outer sleeve and engageable with the forward side of the arm, means yieldably holding arm in engagement with the pin means, and stop means engageable by the arm to stop rotation of the inner member, said outer sleeve continuing to rotate to align the groove with the slot whereby the lead moves adjacent a hook.

6. The apparatus defined in claim 5 including a lost motion connection between the arm and inner member whereby the inner member rotates with the outer sleeve after the arm engages the stop means.

7. The apparatus defined in claim 1 wherein said outer sleeve has a plowing edge inclined forwardly from the inner side of the finger forming the groove.

8. The apparatus defined in claim 1 wherein said inner member has an axial bore open to the chamber for accommodating the end of the shaft carrying the commutator.

9. The apparatus of claim 1 wherein said inner member is a cup-shaped member and has a chamber for shielding the entire commutator and said drive control means includes a lost motion connection allowing limited relative movement between the outer sleeve and cup-shaped member.

10. The apparatus of claim 1 including an outer tubular shaft secured to the outer sleeve and an inner shaft located with the tubular shaft, a lost motion connection coupling the inner shaft to the inner member allowing limited relative movement between the outer sleeve and the inner member, said drive control means having biasing means drivably connecting the tubular shaft with the inner shaft and stop means for limiting rotation of the inner shaft whereby the outer shaft continues to rotate relative to the inner shaft against the force of the biasing means.

11. The apparatus of claim 10 wherein the means for rotating said outer sleeve includes a rack and pinion gear assembly operably connected to the outer shaft and piston and cylinder means for operating the rack and pinion gear assembly to rotate the outer shaft in opposite directions.

12. The apparatus defined in claim 1 wherein said drive means includes means establishing a friction drive between the outer sleeve and the inner member.

13. A lead attaching apparatus usable with a winding machine operable to wind a coil directly into slots of a slotted armature core, said core being mounted on a shaft carrying a commutator provided with a plurality of circumferentially spaced lead receiving hooks comprising a lead moving and guiding unit for carrying the lead extended from one slot partially around the shaft and under a hook, said unit including a first member having first means engageable with said lead, a second member for shielding the commutator, said first member and second member having coacting groove and slot means, means for moving the first member whereby the first means carries the lead around the shaft, drive means connecting the first member with the second member whereby the second member moves with the first member, and drive control means operable to stop one of said members and allow limited relative movement between the first member and the second member whereby the groove and slot means coact to place the lead under a selected hook.

14. The apparatus of claim 1 wherein said lead moving and guiding unit carries a lead more than 100° around the shaft.

15. The apparatus of claim 13 wherein said means for moving the first member carries the lead more than 100° around the shaft.

References Cited

UNITED STATES PATENTS 3,169,301  2/1965  Fletcher et al. _____ 29—205 X
3,191,269  6/1965  Moore _____ 242—13 X JOHN F. CAMPBELL, Primary Examiner C. E. HALL, Assistant Examiner U.S. Cl. X.R.
29—597, 605; 242—13